United States Patent [19]
Turnbull

[11] 3,718,670
[45] Feb. 27, 1973

[54] PROCESS FOR THE PREPARATION OF 17-OXO-STEROIDS FROM 17a-HYDROXY-20-OXO-STEROIDS

[75] Inventor: John Peter Turnbull, London, England

[73] Assignee: Glaxo Laboratories Limited, Middlesex, England

[22] Filed: Dec. 21, 1970

[21] Appl. No.: 100,402

[52] U.S. Cl. ........260/397.3, 260/397.4, 260/397.45
[51] Int. Cl................................................C07c 169/22

[58] Field of Search..........................260/397.3, 397.5

Primary Examiner—Elbert L. Roberts
Attorney—Bacon & Thomas

[57] ABSTRACT

Process for the preparation of 17-oxo-steroids which comprises oxidizing 17α-hydroxy-20-oxo-steroids by means of one-electron transfer oxidizing agents.

6 Claims, No Drawings

PROCESS FOR THE PREPARATION OF 17-OXO-STEROIDS FROM 17α-HYDROXY-20-OXO-STEROIDS

This invention relates to a process for the production of 17-oxo steroids from 17α-hydroxy-20-oxo- steroids.

Steroids having a 17α-hydroxy group and a 20-oxo group are of frequent occurrence in steroid synthesis and many have valuable physiological properties especially in the sex hormone and anti-inflammatory fields. However, corresponding steroids having a 17β-hydroxy group together with a 17α-hydrocarbon group, for example a 17α-ethynyl group, are also found to be particularly active in the sex hormone field and it is valuable to have available a method of converting 17α-hydroxy-20-oxo-steroids into 17β-hydroxy steroids of this type. 17β-hydroxy steroids having a 17α-hydrocarbon group can readily be prepared from 17-oxo steroids by reaction with organometallic reagents and it is possible to convert 17α-hydroxy-20-oxo steroids into 17-oxo steroids by oxidative ketol cleavage using such reagents as chromium trioxide, or lead tetraacetate. However, these reagents are generally non-selective in their attack when other oxidizable groupings are present in the steroid and have generally proved unsuitable.

We have now found that 17α-hydroxy-20-oxo steroids and derivatives thereof possessing a grouping which is convertible to a 20-oxo-group, can be oxidized particularly smoothly and selectively to 17-oxo-steroids by 1-electron transfer oxidizing agents.

The term one-electron transfer oxidizing agent means any oxidizing reagent which effects oxidation by removal of a single electron from the substrate to be oxidized and includes, in particular, ceric salts, especially readily water soluble ceric salts such as ceric ammonium salts, e.g. ceric ammonium nitrate or ceric perchlorate, argentic salts, for example argentic picolinate, argentic oxide and vanadates such as an alkali metal or ammonium vanadate e.g. sodium or potassium vanadate. Other one-electron transfer oxidizing agents of about the same order of oxidation potential as ceric and argentic salts or vanadates or greater may also advantageously be used.

The ceric oxidation is preferably effected under acidic conditions e.g. in an aqueous solution of an inorganic or organic acid, for example an aliphatic acid such as acetic or propionic acid or nitric or sulphuric acid. The reactants may be partially or wholly in solution. An organic solvent for the steroid is preferably present, e.g. a cyclic ether solvent such as tetrahydrofuran or dioxan, a substituted amide solvent such as dimethylformamide or dimethylacetamide or a nitrile solvent such as acetonitrile but an aliphatic acid used to acidify the medium may also serve as solvent. An alcohol such as methanol, ethanol, isopropanol or t-butanol, or a ketone such as acetone or methyl ethyl ketone may be used as solvent but will be slowly oxidized with consequent waste of reagent. It will be noted that the ceric salt itself will normally render the medium acidic; added acid may, however, be beneficial. The argentic oxidation may advantageously be effected under acidic or basic conditions. The use of a vanadate as oxidizing agent generally requires a strongly acidic solution, in particular, to provide sufficient solubility for the reactants.

The ceric oxidizing agents, in particular, react more rapidly than previously proposed oxidizing reagents as well as being more selective and have the added advantages of easy working up, high recovery levels of reagent and economical use of reagent.

Although ceric salts in general may be used for the process of the invention, we particularly prefer to use ceric ammonium nitrate while ceric sulphate is less preferred due to possible complex formation. A stoichiometric quantity or, more preferably a slight excess, of oxidizing agent is preferred, for example 2 to 4 moles (1 to 2 equivalents), e.g. about 2.5 moles. Disadvantages may result from the use of a substantial excess of oxidizing agent, for example oxidation at some point other than the 17-position of the steroids present in the reaction mixture. The risk of such oxidation will, of course, depend upon the exact nature of the steroids concerned. However, the process of this invention provides a generally more facile and specific oxidative cleavage of the 17,20-bond of a 17α-hydroxy-20-oxo-steroid than previously proposed methods.

The reaction time may be of the order of hours although a few minutes is generally sufficient and in some cases less than one minute may be enough. The course of the reaction may be observed by color changes which take place in the solution in which the oxidation is effected. In ceric oxidation a red color is frequently initially formed when the oxidizing agent is added and this color generally fades to a pale yellow or lighter color. These color changes should not however, be considered as giving more than an indication of the progress of the desired oxidation.

The reaction may conveniently be effected at ambient temperature although higher or lower temperatures may also be used. As indicated above, 17-oxo steroids are of especial value as intermediates in the production of 17β-hydroxy steroids having a 17α-hydrocarbon substituent, for example a 17α-ethynyl group, but many 17-oxo steroids are physiologically active themselves. The method according to the present invention thus affords a useful means whereby a wide range of 17-oxo steroids and their derivatives can be prepared from relatively common steroid sources.

By the term steroid as used herein we mean compounds which have the cyclopentanoperhydrophenanthrene structure and which may carry various substituents on the ring structure, for example, alkyl groups, e.g. methyl groups, hydroxy groups, protected hydroxy groups, keto groups, protected keto groups or halogen atoms; a hydroxyl group adjacent to an oxo group or a further hydroxyl group is preferably protected, e.g. by esterification or etherification.

Position 6- may be unsubstituted or substituted, for example, by an alkyl group, in particular a methyl group, or a halogen atom, particularly a fluorine or chlorine atom.

The 9- position may, for example, carry a halogen atom, e.g. fluorine, chlorine or bromine, preferably in the α-configuration.

The 10- and 13-positions may be unsubstituted but will more commonly carry an alkyl group such as the methyl group present in the androstanes and pregnanes, which alkyl group may be substituted, e.g. by a hydroxy group, as in 10-hydroxymethyl steroids. The 10-position may also carry a hydroxy group.

The 11- and 12- positions may be unsubstituted or may be substituted, for example, by hydroxy or keto groups or halogen atoms. Hydroxyl groups at these positions may be protected e.g. by esterification or etherification and oxo groups may also be protected, for example by reduction to hydroxyl followed by protection or by conversion to a ketal. Any halogen atoms which are present are preferably fluorine, chlorine or bromine atoms.

The 16-position may be unsubstituted or may for example, carry an alkyl or alkylene substituent, e.g. a methyl or ethyl group or an exocyclic methylene group.

The 17β-position of the 17α-hydroxy-steroid carries a —CO— group or a group convertible thereto, joined to a further grouping. Thus, for example, the 17β-position may carry a carboxyl or carboxylic ester group e.g. an alkoxy-carbonyl group having 1–6 carbon atoms in the alkyl portion; or more preferably, an acetyl group, which may carry substituents for example a hydroxy group, an acyloxy group e.g. an aliphatic acyloxy group preferably having 1–6 carbon atoms, an araliphatic acyloxy group, preferably having 1–6 carbon atoms in the aliphatic portion or an aryl acyloxy group, the aryl and araliphatic acyloxy groups preferably being monocyclic, a hydrocarbon sulphonyloxy group e.g. a methane or p-toluenesulphonyloxy group, a halogen atom, e.g. fluorine, chlorine or bromine atom, or an alkyl group, preferably having 1–5 carbon atoms. The steroid may thus be a 17α-hydroxy-20-oxo-pregnane carrying at the 21-position a hydroxy or acetoxy group, or more preferably, being unsubstituted at the 21-position.

In the case of steroids possessing at the 20-position a group convertible to an oxo group this group may for example, be a ketal e.g. an acyclic ketal formed with two molecules of an alcohol e.g. an aliphatic alcohol having 1–5 carbon atoms, or a cyclic ketal formed with a diol e.g. ethylene glycol, propane-1,2-diol or butane-2,3-diol. Other groupings convertible to a 20-oxo group include imines such as oxime and alkoxime, e.g. methoxime, groups. Such derivatives are oxidized according to the process of the present invention in the same way as the 20-oxo-steroid without significantly affecting the formation of the desired 17-oxo steroid.

The process according to the invention may be used for the oxidation of 17α-hydroxy-20-oxo-steroids possessing one or more double bonds, for example in the 1,2-; 2,3-; 3,4-; 4,5-; 5,6-; 6,7-; 9,11-; 11,12- or 15,16- positions.

The 3-position may, in general, bear an oxygen substituent in the form, for example, of a keto group or a hydroxy group, which may be respectively in the form of a ketal derivative, or an acyl derivative e.g. an aliphatic acyloxy group preferably having 1–6 carbon atoms, e.g. an acetoxy group, an araliphatic acyloxy group, preferably having 1–6 carbon atoms in the aliphatic portion or an aryl acyloxy group, e.g. a benzoyloxy group, the aryl and araliphatic acyloxy groups preferably being monocyclic; a hydrocarbon sulphonyloxy group, e.g. a methane or p-toluenesulphonyloxy group; or an ether group, e.g. an alkoxy or aralkoxy group having 1–5 carbon atoms in the aliphatic portion or an aryloxy group, the aryloxy or aralkoxy groups preferably being monocyclic. Where the A-ring is aromatic and an oxygen substituent, e.g. an acyloxy or ether group, is present in the 3-position, reaction may take place at the 9- and 11- positions and, for example, ceric salts in the presence of nitrate ions yield 11β-nitro-oxy-9-hydroxy steroids.

The stereochemistry of the junction between the A and B rings also appears to have little effect on the course of the present reaction and compounds having either cis- or trans- AB ring junctions may be oxidized. The 5-position in such cases usually carries a hydrogen atom.

As indicated above, the process according to the invention is especially useful in converting 17α-hydroxy-20-oxo-pregnanes which are already in use, and are therefore available at an economical price, into corresponding 17-oxo-steroids which can serve as intermediates in the preparation of 17α-hydrocarbyl-17β-hydroxy steroids by reaction with organometallic reagents. Thus, for example in our British Pat. No. 1,202,521, we have described both 11α-hydroxy-oestr-4-ene-3,17-dione and 11α,17α-dihydroxy-19-norpregn-4-ene-3,20-dione as intermediates in the preparation of 11β-chloro-oestr-4-ene-3,17-dione and 11β-chloro-17α-hydroxy-19-norpregn-4-ene-3,20-dione respectively, which are intermediates in the preparation of 11β-chloro-17α-ethynyl-17β-hydroxy-oestr-4-ene-3-one and 17α-acetoxy-6,11β-dichloro-19-norpregn-4,6-dien-3,20-dione respectively both of which are highly active progestagens; the present process enables 11α-17α-dihydroxy-19-norpregn-4-ene-3,20-dione to serve as a common intermediate in the preparation of both progestagens with consequent economic advantages.

The following Examples are given by way of illustration only: all temperatures are in °C:

Melting points were determined in open capillaries and are corrected. Optical rotations are for chloroform solutions except where stated otherwise. Plates for thin-layer chromatography were coated with Merck Kieselgel $PF_{254+366}$ and were visualized by spraying with 2N sulphuric acid and baking at ca. 150°.

In all the Examples 1–15 and 17–24 described below the reaction was carried out in essentially the same way. A stirred solution or suspension of steroid in a suitable water-miscible solvent was treated at ambient temperature with an appropriate amount (1–1.5 equivs.) of molar aqueous ceric ammonium nitrate (546 g. per liter). Completion of each reaction was indicated by disappearance of the initially-formed red coloration, and confirmed by thin-layer chromatography. The weight of starting material, solvent, volumes of solvent and reagent employed, and reaction time for each Example are tabulated in Tables IA and IIA.

Each product was isolated by one of the following methods:

Method A

When the reaction was complete, the reaction mixture was slowly diluted with water (ca. 5 × the volume of the reaction mixture). After ca. 1 hr. the crystalline product was filtered off, washed with water, then light petroleum (b.p. 40°/60°) and dried. The yield, m.p. and $[\alpha]_D$ of each product isolated by Method A are listed in Table IB.

Method B

When the reaction was complete the reaction mixture was poured into water and the product was extracted into ethyl acetate. The extract was washed with dilute aqueous alkali, then with water, and was then evaporated in vacuo. After filtration through a little magnesium silicate in methylene chloride or chloroform, the residue was crystallized from a suitable solvent. The yield, crystallizing solvent, m.p. and $[\alpha]_D$ for each product isolated by method B are listed in Table IIB.

COMPOUNDS PREPARED FOLLOWING METHOD A

TABLE IA

| Example | Starting material (mg.) | solvent | Vol. of solvent (ml.) | Vol. of reagent (ml) | Reaction time (min) |
|---|---|---|---|---|---|
| 1 | 180 | acetic acid | 2.5 | 1.3 | 15 |
| 7a | 3470 | acetic acid | 50 | 25 | 20 |
| 7b | 3470 | ethanol | 50 | 30 | 100 |
| 8a | 195 | acetic acid | 3 | 1.1 | 1 |
| 8b | 195 | Dioxan | 3 | 1.2 | 2 |
| 9a | 217 | acetic acid | 3 | 1.2 | 3 |
| 9b | 217 | Dioxan | 3 | 1.2 | 10 |
| 14 | 230 | acetic acid | 3 | 1.4 | 10 |
| 15 | 82 | acetic acid | 2 | 1.0 | 20 |
| 17b | 392 | acetic acid | 5 | 2.5 | 10 |
| 18a | 376 | acetic acid | 10 | 2.0 | 1 |
| 19 | 374 | acetic acid | 10 | 2.2 | 30 |
| 21 | 1000 | acetic acid | 15 | 7.0 | 25 |
| 24 | 64 | acetic acid | 2 | 0.5 | 10 |

COMPOUNDS PREPARED FOLLOWING METHOD A

TABLE IB

| Product % Yield | m.p. | $[\alpha]_D$ | Example |
|---|---|---|---|
| 35 | 216–219° | +308° (c,1.01) | 1 |
| 70 | 168–171° | +193° (c,1.00) | 7a |
| 67 | 161–168° | +189° (c,1.28) | 7b |
| 80 | 148–151° | +97° (c,0.51) | 8a |
| 78 | 151–153° | +105° (c,0.50) | 8b |
| 85 | 153.5–155° | +103° (c,0.50) | 9a |
| 79 | 154–155° | +104° (c,0.50) | 9b |
| 78 | 190-196° (dec) | | 14 |
| 40 | 166–168 | +189° (c,0.50) | 15 |
| 40 | 240–242° | +104° (c,0.50) | 17b |
| 55 | 270–275° | +102° (c,0.50) | 18a |
| 70 | 182–185° | | 19 |
| 81 | 167–169° | +99° (c,0.50) | 21 |
| 78 | 171–181° | +124° (c,0.25) | 24 |

COMPOUNDS PREPARED FOLLOWING METHOD B

TABLE IIA

| Example | Starting material (mg.) | Solvent | Vol. of solvent (ml.) | Vol. of reagent (ml.) | Reaction time (min) |
|---|---|---|---|---|---|
| 2 | 346 | acetic acid | 4 | 3.0 | 10 |
| 3 | 346 | acetic acid | 6 | 2.0 | 2 |
| 4 | 320 | acetic acid | 5 | 2.5 | 5 |
| 5 | 275 | acetic acid | 5 | 2.5 | 5 |
| 6 | 600 | acetic acid | 6 | 5.0 | 1 |
| 10 | 181 | acetic acid | 3 | 1.2 | 10 |
| 11 | 180 | acetic acid | 3 | 1.2 | 30 |
| 12 | 180 | acetic acid | 3 | 2.0 | 90 |
| 13 | 20,000 | acetic acid | 400 | 130 | 40 |
| 17a | 188 | acetic acid | 5 | 1.1 | 1 |
| 18b | 392 | acetic acid | 5 | 2.5 | 2 |
| 20 | 105 | acetic acid | 1.25 | 0.7 | 6 |
| 22 | 374 | acetic acid | 10 | 2.5 | 20 |
| 23 | 390 | acetic acid | 10 | 2.5 | 60 |

COMPOUNDS PREPARED FOLLOWING METHOD B

TABLE IIB

| Ex: Crystallization Solvent | Product % Yield | m.p. | $[\alpha]_D$ |
|---|---|---|---|
| 2 Cyclohexane/chloroform | 40 | 168.5–170° | +187° (c,0.95) |
| 3 Cyclohexane;chloroform | 67 | 176.5–178° | +160° (c,1.02) |
| 4 Aq. methanol | 65 | 169–171° | +140° (c,0.50) |
| 5 Ethyl acetate | 45 | 206–208° | |
| 6 Cyclohexane/methylene chloride | 49 | 187–189° | +250° (c,0.50) |
| 10 Cyclohexane/methylene chloride | 68 | 183–188° | +102° (c,0.50) |
| 11 Cyclohexane/methylene chloride | 69 | 194–198° | +222° (c,0.58 in acetone) |
| 12 Aq. acetone | 30 | 187–190° | (c,0.59 +103° in acetone) |
| 13 Cyclohexane/methylene chloride | 61 | 153–154° | +154° (c,1.00) |
| 17a Aq. methanol | 66 | 221–227° | +98° (c,0.80) |
| 18b Aq. methanol | 30 | 274–276° | +105° (c,0.50) |
| 20 Methanol | 35 | 151–153° | +198° (c,0.50) |
| 22 Acetone/light petroleum (b.p. 40–60°) | 46 | 233–235° (dec) | +9° (c,0.95 in DMSO) |
| 23 Acetone | 33 | 233–238° (dec) | |

EXAMPLE 1

Androst-4-ene-3,11,17-trione:

From 17α,21-dihydroxy-pregn-4-ene-3,11,20-trione the title compound was obtained following isolation by Method A.

EXAMPLE 2

19-Hydroxyandrost-4-ene-3,17-dione:

From 17α,19-dihydroxypregn-4-ene-3,20-dione, the title compound was obtained following isolation by Method B.

EXAMPLE 3

5α-Androstane-3,11,17-trione:

From 17α-hydroxy-5α-pregnane-3,11,20-trione, the title compound was obtained following isolation by Method B.

EXAMPLE 4

Oestr-4-ene-3,17-dione

From 17α-hydroxy-19-norpregn-4-ene-3,20-dione the title compound was obtained following isolation by Method B.

EXAMPLE 5

11α-Hydroxyoestr-4-ene-3,17-dione:

From 11α,17α-dihydroxy-19-norpregn-4-ene-3,20-dione the title compound was obtained following isolation by Method B.

EXAMPLE 6

11β-Chloro-oestr-4-ene-3,17-dione:

From 11β-chloro-17α-hydroxy-19-norpregn-4-ene-3,20-dione, the title compound was obtained following isolation by Method B.

EXAMPLE 7

Androst-4-ene-3,17-dione:

From 17α,21-dihydroxy-pregn-4-ene-3,20-dione, the title compound was obtained following isolation by Method B. In separate preparations, acetic acid (Example 7a) and ethanol (Example 7b) were used as reaction solvent. The product in 7b contained ca. 2 percent of starting material.

EXAMPLE 8

3β-Acetoxy-5α-androstane-11,17-dione:

From 3β-acetoxy-17α-hydroxy-5α-pregnane-11,20-dione, the title compound was obtained following isolation by Method A. In separate preparations, acetic acid (Example 8a) and dioxan (Example 8b) were used as reaction solvent. The material obtained in 8a contained ca. 2 percent of starting material.

EXAMPLE 9

3β-Acetoxy-5α-androstane-11,17-dione:

From 3β-acetoxy-20,20-ethylenedioxy-17α-hydroxy-5α-pregnan-11-one, the title compound was obtained following isolation by Method A. In separate preparations, acetic acid (Example 9a) and dioxan (Example 9b) were used as reaction solvent.

EXAMPLE 10

3β-Hydroxy-16β-methyl-5α-androstane-11,17-dione:

From 3β,17α-hydroxy-16β-methyl-5α-pregnane-11,20-dione the title compound was obtained following isolation by Method B.

EXAMPLE 11

Androsta-1,4-diene-3,11,17-trione:

From 17α,21-dihydroxypregna-1,4-diene-3,11,20-trione, the title compound was obtained following isolation by Method B.

EXAMPLE 12

11β-Hydroxyandrosta-1,4-diene-3,17-dione:

From 11β,17α,21-trihydroxypregna-1,4-diene-3,20-dione, the title compound was obtained following isolation by Method B.

EXAMPLE 13

5α-Androst-9(11)-ene-3,17-dione:

From 17α-hydroxy-5α-pregn-9(11)-ene-3,20-dione, the title compound was obtained following isolation by Method B, except that purification of the product was by chromatography over alumina (Spence, Grade H) in methylene chloride in place of filtration through magnesium silicate.

EXAMPLE 14

3β-Acetoxy-9α,11β-dichloro-16β-methyl-5α-androstan-17-one:

From 3β-acetoxy-9α,11β-dichloro-17α-hydroxy-16β-methyl 5α-pregnan-20-one, the title compound was obtained following isolation by Method A. A recrystalized sample (aq. methanol) had m.p. 198°–204° (dec); $[\alpha]_D + 74°$ (c,0.60).

EXAMPLE 15

Androst-4-ene-3,17-dione:

From 17β-carboxy-17α-hydroxy-androst-4-en-3-one, the title compound was prepared following isolation by Method A.

EXAMPLE 16

17α-Hydroxy-19-nor-5β-pregnane-3,20-dione:

17α-Hydroxy-19-norpregn-4-ene-3,20-dione (320 mg) in ethyl acetate (30 ml.) was hydrogenated over 10 percent palladium-on-charcoal (320 mg.) at ambient temperature and pressure until uptake ceased.

Removal of the catalyst by filtration and concentration of the filtrate gave the title compound as needles (180 mg; 57 percent) m.p. 226°–229°; $[\alpha]_D + 17.5°$ (c,0.65).

EXAMPLE 17

9α-Fluoro-11β-hydroxy-16α-methyl-androsta-1,4-diene-3,17-dione a. From 11β,17α-dihydroxy-9α-fluoro-16α-methylpregna 1,4-diene-3,20-dione, the title compound was obtained following isolation by Method B. A recrystalized sample (aq. methanol) had m.p. 236°–238°.

b. From 9α-fluoro-16α-methyl-11β,17α,21-trihydroxypregna-1,4-diene-3,20-dione, the title compound was obtained following isolation by Method A.

EXAMPLE 18

9α-Fluoro-11β-hydroxy-16β-methyl-androsta-1,4-diene-3,17-dione:

a. From 11β,17α-dihydroxy-9α-fluoro-16β-methyl-pregna-1,4-diene-3,20-dione, the title compound was obtained following isolation by Method A.

b. From 9α-fluoro-16β-methyl-11β,17α,21-trihydroxypregna-1,4-diene-3,20-dione, the title compound was obtained following isolation by Method B.

EXAMPLE 19

9α-Fluoro-16β-methylandrosta-1,4-diene-3,11,17-trione:

From 9α-fluoro-17α-hydroxy-16β-methylpregna-1,4-diene-3,11,20-trione, the title compound was obtained following isolation by Method A. A recrystallized sample (aq. methanol) had m.p. 188.5°–190°; [α]$_D$+213° (c,0.50).

EXAMPLE 20

6,11β-Dichloro-oestra-4,6-diene-3,17-dione:

From 6,11β-dichloro-17α-hydroxy-19-norpregna-4,6-diene-3,20-dione, the title compound was obtained, following isolation by Method B.

EXAMPLE 21

Androsta-1,4,9(11)-triene-3,17-dione:

From 17α-hydroxypregna-1,4,9(11)-triene-3,20-dione the title compound was obtained following isolation by method A.

EXAMPLE 22

9α-Fluoro-11β-hydroxy-16-methylene-androsta-1,4-diene-3,17-dione:

From 9α-fluoro-11β,17α-dihydroxy-16-methylene-pregna-1,4-diene-3,20-dione, the title compound was obtained, following isolation by Method B, including preparative thin-layer chomatography.

EXAMPLE 23

9α-Fluoro-11β-hydroxy-16-methylene-androsta-1,4-diene-3,17-dione:

From 9α-fluoro-11β,17α,21-trihydroxy-16-methylene-pregna1,4-diene-3,20-dione, the title compound was obtained following isolation by Method B, including preparative thin-layer chromatography.

EXAMPLE 24

5β-Oestrane-3,17-dione:

From 17α-hydroxy-19-nor-5β-pregnane-3,20-dione the title compound was obtained following isolation by Method A.

EXAMPLE 25

3β-Acetoxy-5α-androstane-11,17-dione using various solvents:

3β-Acetoxy-17α-hydroxy-5α-pregnane-11,20-dione (390 mg.) in solvent (10 ml.) was treated at ambient temperature with molar aqueous ceric ammonium nitrate (2.3 ml.). After 25 min., an aliquot (ca. 0.1 ml.) was diluted with water (1 ml.) the steroid extracted with ether (1 ml.) and the extract submitted to thin-layer chromatographic analysis using light petroleum (b.p. 40/60)-acetone (3:1) as solvent. Results are tabulated below.

| Solvent | % Starting Material (R$_F$~ 0.4) | % 17-Ketone (R$_F$ ~ 0.5) |
|---|---|---|
| Acetone | 30 | 60 |
| Tert-butanol | 20 | 70 |
| Tetrahydrofuran | 45 | 40 |
| Dimethylformamide | 20 | 75 |
| Methanol | 15 | 75 |
| Acetonitrile | 5 | 90 |

EXAMPLE 26

Oestr-4-ene-3,17-dione using oxidants other than ceric ammonium nitrate:

a. A solution of ca 0.5 molar ceric perchlorate in N aqueous perchloric acid was prepared by stirring ceric sulphate (10 g.) in N aqueous perchloric acid (30 ml.) with a solution of barium perchlorate trihydrate (20 g.; ca 1.1 equiv.) in N aqueous perchloric acid (10 ml.). After 18 hr. the precipitate was removed by centrifugation and the supernatant ceric perchlorate solution was used without further processing.

17α-Hydroxy-19-norpregn-4-ene-3,20-dione (160 mg.) in acetic acid (3 ml.) was treated with ca 0.5 molar aqueous ceric perchlorate (as described above) in 1 ml. portions until the yellow color was not rapidly discharged (4 ml. required). Thin-layer chromatographic analysis of the mixture (as described in Example 25) indicated formation of the title compound (R$_F$~0.45 in ca. 85 percent amount.

b. Ammonium vanadate (468 mg.) was added with cooling to a solution of 98 percent sulphuric acid (1.0 ml.) in acetic acid (5 ml.) and water(5 ml.). To the resultant red/brown slurry was added a solution of 17α-hydroxy-19-norpregn-4-ene-3,20-dione (317 mg.) in acetic acid. After 3 hr., the red-brown solid had dissolved and the solution was green/blue indicating complete consumption of the oxidant. Thin-layer chromatographic analysis of the product (as described in Example 25 but using chloroform (2 runs) in place of light petroleum-acetone) indicated formation of the title compound (R$_F$~0.55) in ca. 65 percent amount, with 20 percent of starting material unchanged (R$_F$~0.25.

c. Reaction (b) above was repeated except for the use of 70 percent nitric acid (2.0 ml.) in place of 98 percent sulphuric acid. Thin-layer chromatographic analysis of the product after 3 hr. (as in (b) above) indicated formation of the title compound (R$_F$~0.55) in ca. 70 percent amount with only a trace of unreacted starting material.

We claim:

1. A process for the preparation of a 17-oxo steroid which comprises oxidizing a 17α-hydroxy steroid having at the 20-position an oxo-, ketal, or imino group by means of a one-electron transfer oxidizing agent selected from the group consisting of a ceric salt, an argentic salt, argentic oxide and a vanadate.

2. The process as claimed in claim 1 wherein the one-electron transfer oxidizing agent is ceric ammonium nitrate or ceric perchlorate.

3. The process as claimed in claim 1 wherein the oxidation is effected in the presence of an organic solvent for the steroid the organic solvent being a cyclic ether, a substituted amide, a nitrile or an aliphatic acid.

4. The process as claimed in claim 1 wherein from 2 to 4 moles of the said oxidizing agent per mole of steroid starting material are used.

5. The process as claimed in claim 1 wherein the steroid starting material is a pregnane in which the 20-position carries a ketal or imine group.

6. The process as claimed in claim 1 wherein the steroid starting material is 11α,17α-dihydroxy-19-norpregn-4-ene-3,20 dione or 11β-chloro-17α-hydroxy-19-norpregn-4-ene-3,20-dione.

* * * * *